United States Patent [19]

Maxwell, Jr.

[11] 4,065,793
[45] Dec. 27, 1977

[54] TRANSLATOR FOR PROCESSING METER TELEMETRY RECORDING CONTAINING POWER LOSS PULSES

[75] Inventor: Albert H. Maxwell, Jr., Raleigh, N.C.

[73] Assignee: Westinghouse Electric Corporation, Pittsburgh, Pa.

[21] Appl. No.: 624,348

[22] Filed: Oct. 21, 1975

[51] Int. Cl.² .......................................... G01D 15/12
[52] U.S. Cl. ...................................... 360/6; 324/113
[58] Field of Search ................ 360/6, 40; 324/103 R, 324/74, 110, 113, 114, 142; 340/150, 203, 206, 167 A, 188

[56] References Cited

U.S. PATENT DOCUMENTS

| | | | |
|---|---|---|---|
| 3,500,431 | 3/1970 | Baskin | 360/6 |
| 3,678,484 | 7/1972 | Maxwell, Jr. | 360/6 |
| 3,747,083 | 7/1973 | Coia | 340/206 |
| 3,750,156 | 7/1973 | Martell | 340/203 |
| 3,821,716 | 6/1974 | Ghajar | 360/40 |
| 3,913,130 | 10/1975 | Doby | 360/6 |
| 3,921,207 | 11/1975 | Doby et al. | 360/6 |

*Primary Examiner*—Jay P. Lucas

*Attorney, Agent, or Firm*—R. W. Smith

[57] ABSTRACT

A translator system which includes circuitry for differentiating between normal interval timing pulses and power loss pulses on meter telemetry recordings. The pulses are recorded with a different waveform and are applied to wave-shaping circuitry which produces pulses corresponding to the time interval pulses which are longer than the pulses produced which correspond to the power loss pulses. A pulse duration recognizing circuit distinguishes between the pulses of different duration and provides a pulse output at one of two terminals depending on which pulse type is recognized. Pulses corresponding to the time interval pulses are transferred to the analyzing circuits of the translator. A masking circuit prevents recognition of a power loss pulse except during a predetermined time interval which corresponds to the only time such a pulse may correctly exist on the recording. Circuitry is included which informs the analyzing circuits of the translator when a power loss pulse is properly recognized. Means is also included for manually or automatically programming the translator to correctly read meter readings made with or without the capability of including power loss pulses on the recording.

7 Claims, 5 Drawing Figures

TRANSLATOR FOR PROCESSING METER TELEMETRY RECORDING CONTAINING POWER LOSS PULSES

BACKGROUND OF THE INVENTION

1. Field of the Invention

This invention relates, in general, to recording systems associated with electrical meters and, more specifically, to translator systems which process tapes recorded

2. Description of the Prior Art

The use of magnetic tapes to record pulses corresponding to quantities measured by electrical meters has been known and used for several years. One such system is described in U.S. Pat. No. 3,148,329, which is assigned to the assignee of this invention. Using a tape recording of the electrical quantities provides valuable information to the electric utility company when the recording includes timing interval pulses. Among other things, the tapes can be used to determine when a peak demand has occurred or a specific pattern is developing concerning energy demand or use.

In order for the recorded readings to be useful, it is necessary that the magnetic tape be removed from the recording apparatus and analyzed by suitable electronic data processing equipment. Such equipment normally includes a translator system which performs some of the analysis on the recorded tape and transfers the readings from the tape removed from the meter onto conventonal tape which is compatible with most electronic data processing tape readers. A translator used for this purpose is described in U.S. Pat. No. 3,740.724. which is assigned to the assignee of this invention. In addition, it is advantageous to have the tape recording packaged in such a manner that it can be easily removed from the recording meter and conveniently inserted into the translating apparatus. A cartridge tape which provides this convenience is described in U.S. Pat. No. 3,678,484, which is also assigned to the assignee of this invention.

The time interval pulses or signals recorded on the magnetic tape are usually positioned on one specific track of the tape which is dedicated to recording only these time interval pulses. Although tapes recorded in this format are a valuable tool in analyzing the power and demand of the location being monitored, certain limitations on the interpretation of the information inherently exist. Among other things, power outages can cause indefinite information to be applied to the recording tape with either conventional or batter carryover type recording apparatus. Thus, it has been found desirable to include a loss of power indication on the recording tape along with the normal time interval indications.

In some magnetic tape recording systems, the loss of power pulses are placed on the magnetic tape in the same track or channel as the time interval pulses and are distinguished therefrom by the translating apparatus by a unique placement of the power loss pulses with respect to the time interval pulses. With such arrangements, the shape of the time interval pulses and the loss of power pulses is identical. Although such arrangements have been found very useful in the prior art, it has been found desirable to change the pulse shape of the loss of power pulse with respect to the tine interval pulse to aid in the distinction between time interval pulses and loss of power pulses on the recorded tape. A recording system which uses different pulse shapes for the timing interval pulses and the power loss pulses is described in U.S. Pat. No. 3,913,130 issued Oct. 14, 1975 and assigned to the assignee of this invention. It is true, however, that many recorders presently operating do not impress loss of power pulses on the magnetic tape and that a practical translation system must be capable of translating information derived from both tape recording formats.

Therefore, it is desirable, and it is an object of this invention, to provide translating apparatus which will suitably process and analyze magnetic tapes recorded according to the format outlined in the referenced U.S. Pat. No. 3,913,130 . It is also desirable, and it is a further object of this invention, to provide translation apparatus which is compatible with magnetic tapes recorded with the time interval pulse format only and with the time interval and loss of power pulse format.

SUMMARY OF THE INVENTION

There is disclosed herein a new and useful translator system which is compatible with magnetic tapes recorded at electrical meter installations having only time interval pulses and with magentic tapes recorded at electrical meter installations having both time interval pulses and loss of power pulses recorded on the same tape channel. The translator includes a pulse shaping circuit which converts the time interval pulses and the loss of power pulses into square wave pulses of different pulse duration. The square wave pulses are applied to a pulse duration recognizing circuit which provides an output at one terminal when the longer pulse, corresponding to the time interval signal, has been received and an output at another terminal when the shorter pulse, corresponding to the loss of power signal, has been received.

The pulses from the two terminals of the pulse duration recognizing circuit are applied to gate circuits which are programmed by other circuitry in the translator to suitably process the pulse signals according to the recognized format of the pulses on the tape recording. When the translator recognizes a recording format which includes only time interval pulses, the gates are set or programmed in such a manner that the time interval pulses are transferred to the analyzing circuitry of the translator. At the same time, the gates are programmed in such a manner that the translator does not recognize any pulses which might be interpreted as power loss pulses. When the format is recognized as a recording containing time interval pulses and loss of power pulses with different wave-shapes, the gates are programmed, either manually or automatically, to transfer the time interval signals to the analyzing portions of the translator and to apply the loss of power pulses to additonal circuitry which flags the translator analyzer that a power loss has occurred. Automatic programming the translator circuits upon recognition of the recording format is accomplished, in one specific embodiment, by recognizing the characteristics of the first time interval pulse recorded on the tape. Circuitry is also included which prevents the loss of power detecting circuitry from being activate during time intervals in which a loss of power pulse should not be present on the recorded tape.

BRIEF DESCRIPTION OF THE DRAWING

Further advantages and uses of this invention will be more apparent when considered in view of the following detailed description and drawing, in which.

DESCRIPTION OF THE PREFERRED EMBODIMENTS

Figure 1:
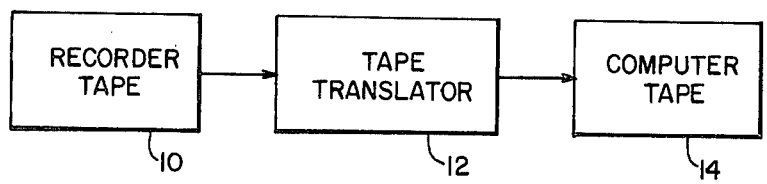
FIG. 1 is a block diagram of a translation system constructed according to this invention.

Throughout the following description, similar reference characters may refer to similar elements or members in all of the FIGS. of the drawing.

Referring now to the drawing, and to FIG. 1 in particular, there is shown in block diagram of an electrical meter telemetry translator system constructed according to this invention. The recorder tape 10, which may be in cartridge form, is inserted or connected to the tape translator 12 for suitable processing and recording on a standard computer tape 14. The tape translator 12 is used to modify the electrical signals on the recorder tape 10 so that the modified signals on the computer tape 14 are compatible with most electronic data processing equipment. The tape translator 12 may also include circuitry which provides some information about the recorded signals as they are being translated to the computer tape 14.

Figure 2:
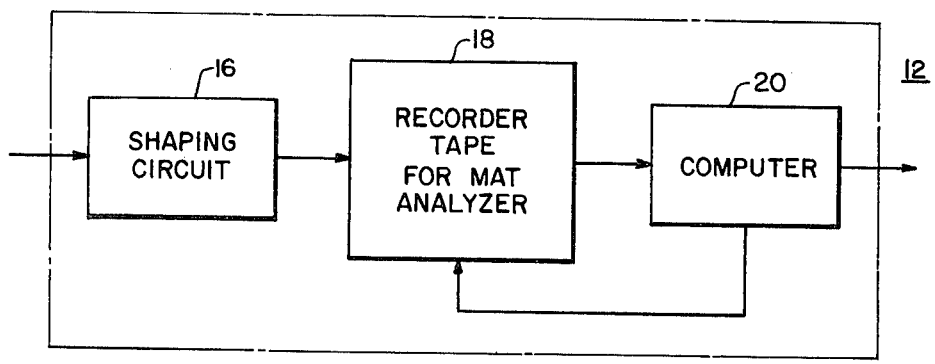
FIG. 2 is a block diagram of the tape translator indicated in FIG. 1.

FIG. 2 is a block diagram of the tape translator 12 shown in FIG. 1. The input signals from the recording head in the tape translator are applied to a waveform shaping circuit 16 which conditions the pulses from the recording head for application to the recorder tape format analyzer 18. The format analyzer 18 determines whether the recorder tape has been recorded on a meter which was only equipped for placing time interval signals upon the magnetic tape or was equipped for placing both time interval signals and loss of power signals upon the magnetic tape. The computer 20, which is a part of the translator 12, is used to help program the recorder in one form tape format analyzer 18. Once the nature or format of the input signals has been analyzed, the information pulses are transferred from the analzyer 18 to the computer 20 and to the storage computer tape 14.

Figure 3:
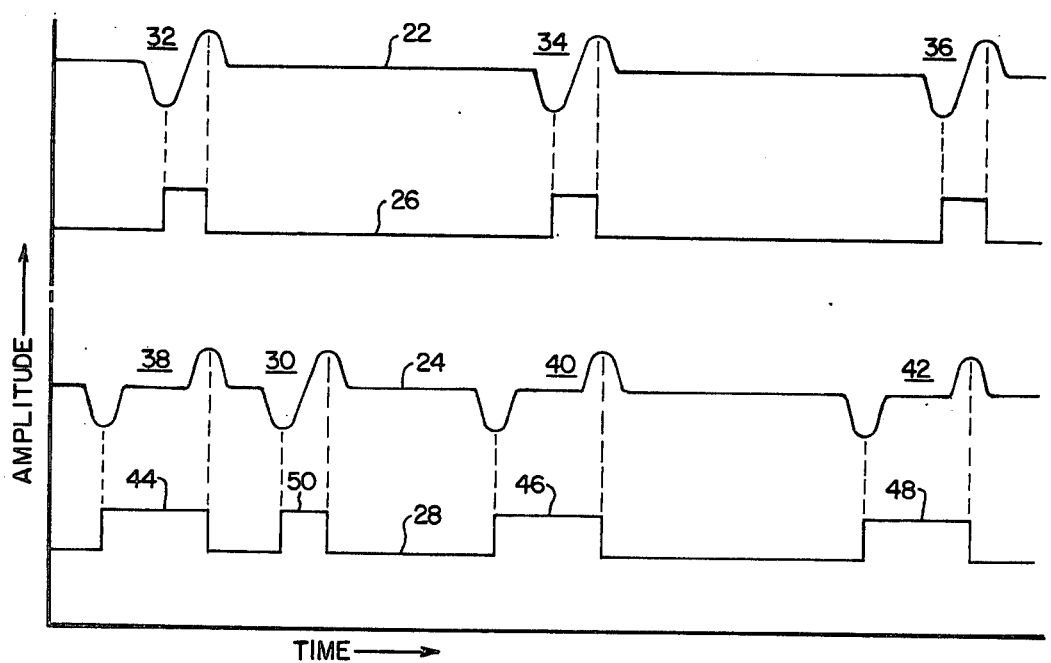
FIG. 3 is a graph illustrating various waveforms which may exist within the recorder tape format analyzer shown in FIG. 2.

FIG. 3 illustrates waveforms which will be used in explaining the operation of the translator disclosed herein. The graphs 22 and 24 illustrate the signal voltage which would be applied to the shaping circuit 16 from the tape reading head of the translator system. The graph 22 corresponds to the time interval pulses which would be recorded on a conventional meter telemetry recording which does not have provisions for loss of power pulses. Graph 24 indicates the voltage signals which would be present on a magnetic recording which had been recorded by an electrical meter which had provisions for recording a loss of power signal in the same form as the time interval pulses in the graph 22, such as the loss of power (LOP) pulse 30 and time interval pulses 38, 40 and 42 in a different and second form. The pulse formal illustrated by graph 24 is typical of the voltage signal levels which would be obtained from the timing channel of a recording made according to the invention disclosed in U.S. Pat. No. 3,913,130 .

it can be seen from inspection of graphs 22 and 24 that the time interval signals or pulses 32, 34 and 36 having one form, which would be from a conventional recording tape, and are different than the time interval pulses 38, 40 and 42 having a second form which would be obtained from a tape recorded on the apparatus constructed according to the referenced U.S. Pat. No. 3,913,130. It is one object of the translator system to be able to properly analyze both types of magnetic tape recordings and, according to a specific embodiment of this invention, automatically determine which type of recording format has been applied to the translator system.

The time interval pulses 32, 34 and 36, as well as the pulses 38, 40 and 42, would normally be recorded on the magnetic tape at predetermined intervals, such as every 15 minutes. The relative spacing between the positive and negative excursions of the waves and the spacing between the various pulses is not necessarily illustrated in true scale. For example, the negative excursion of the pulse 38 actually occurs only a fraction of a second in time different from the positive excursion of the pulse 38, not a matter of minutes which would be true if the graph 24 was drawn to scale and the pulses 38 and 40 were separated by 15 minutes.

The type of pulses illustrated as the time interval pulses 32, 34 and 36 in graph 22 and as the loss of power pulse 30 in graph 24 are referred to return-to-bias (RB) pulses. The second form of pulses which indicate the time interval pulses 38, 40 and 42 in graph 24 are known as non-return to zero (NRZ) pulses. The electrical difference between the pulses is accomplished in the meter recorder due to electrical and/or mechanical components of the recorder which produce the recording pulses.

This invention deals primarily with the time interval and loss of power (LOP) pulses generated and recorded in remote meter telemetry installations. The recording tape normally would have at least one other channel containing pulses relative to the amount of energy or demand occurring at the meter with respect to the recorded time interval pulses. Consequently, there are two different types of time interval pulse formats which may be applied to the tape translator and which are represented generally by the graphs 22 and 24. Since it is an object of this invention to provide a translator system which can translate and properly analayze either type of recording, it is necessary that the translator be capable of processing recorded tapes containing reproduced pulses as shown in graph 22 as well as processing tapes which contain pulses as shown in graph 24.

Graphs 26 and 28 represent the output of the wave-shaping circuit 16 shown in FIG. 2 corresponding to the graphs 22 and 24, respectively. In general, the graphs 26 and 28 represent that positively going pulses occur when the reproduced signal reaches its maximum negative voltage excursion and the pulses end when the reproduced signal reaches its maximum positive excursion thereafter. The broken lines interconnecting the graphs 22 and 26 and the graphs 24 and 28 indicate this relationship between the reproduced recorded pulses and the pulses provided at the output of the wave-shaping circuit 16. The circuit may be adjusted so that the pulses begin anywhere during 0° to 90° of the reproduced pulse and end anywhere during 180° to 270 ° of the reproduced pulse. It can also be seen that the duration of the pulses which correspond to the time interval pulses on the graph 24 are no longer than the pulse 50 on the graph 28 which corresponds to the loss of power pulse 30 on the graph 24. For identification purposes, the pulses 44, 46 and 48 on the graph 28 represent time interval pulses and the pulse 50 on the graph 28 represents a loss of power pulse.

Figure 4:
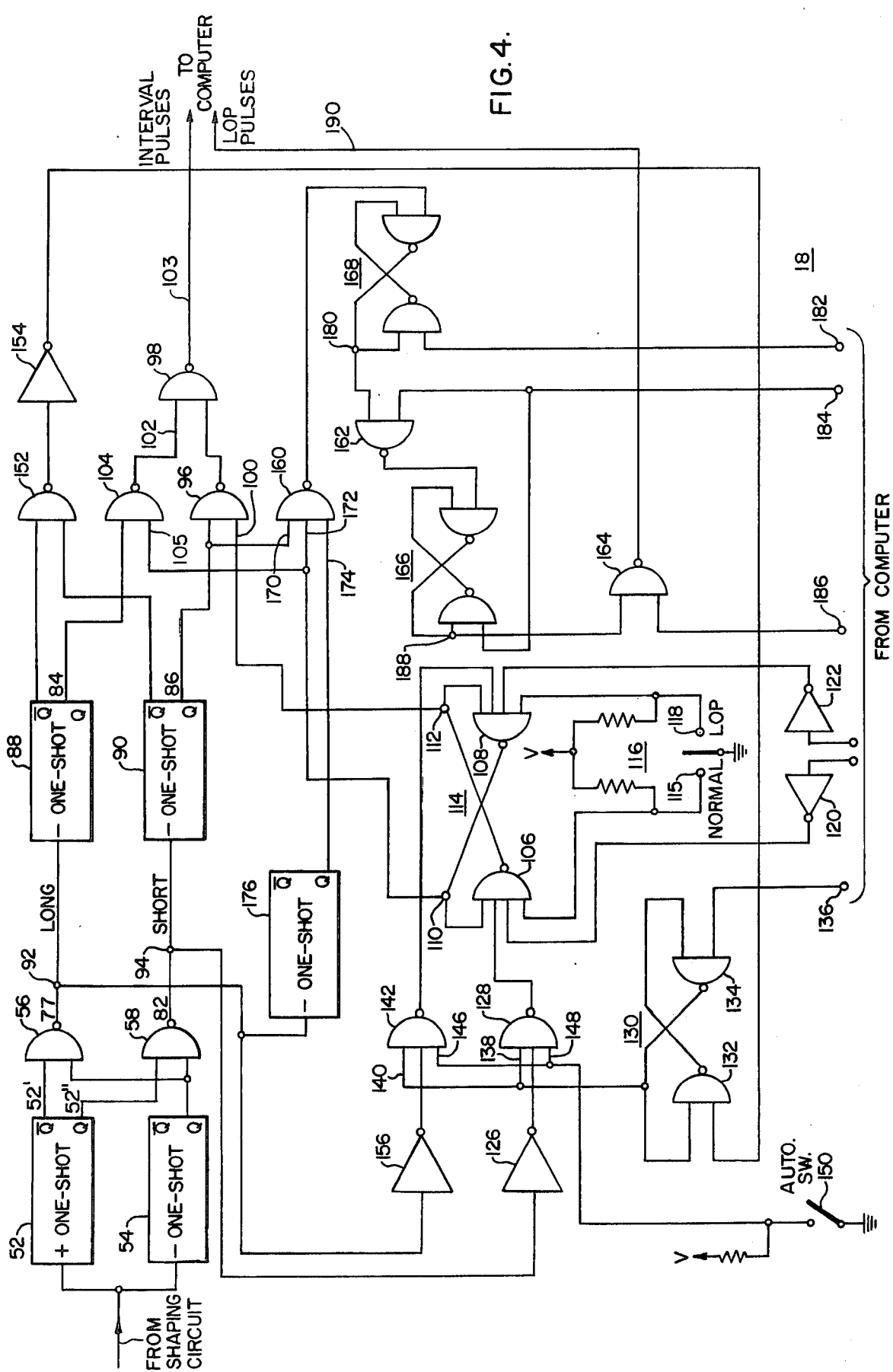
FIG. 4 is a logic diagram of the recorder tape format analyzer shown in FIG. 2.

FIG. 4 represents a logic diagram of the recorder tape format analyzer 18 shown in FIG. 2 and which is used by the translator to, among other things, determine which type of recording format is being translated. That is, whether the recording contains pulse corresponding to graph 26 shown in FIG. 3 or contains pulses corresponding to graph 28 shown in FIG. 3.

FIG. 4 will first be described assuming that the recording tape contains pulses as represented by graph 28. The input signal is applied from the shaping circuit to the one-shot multivibrator circuits 52 and 54 which are connected as illustrated to the NANC gates 56 and 58. The multivibrator circuit 52 is connected to trigger and the leading edge of the wave and remain triggered for a predetermined length of time. The multivibrator circuit 54 is connected to trigger on the trailing edge of the input wave and remain triggered for a predetermined length of time which is less than the predetermined length of time for which the multivibrator circuit 52 remains triggered. Triggering durations for the multivibrator circuits of one millisecond for the circuit 52 and one microsecond for the circuit 54 are adequate to provide the desired functions.

Figure 5:
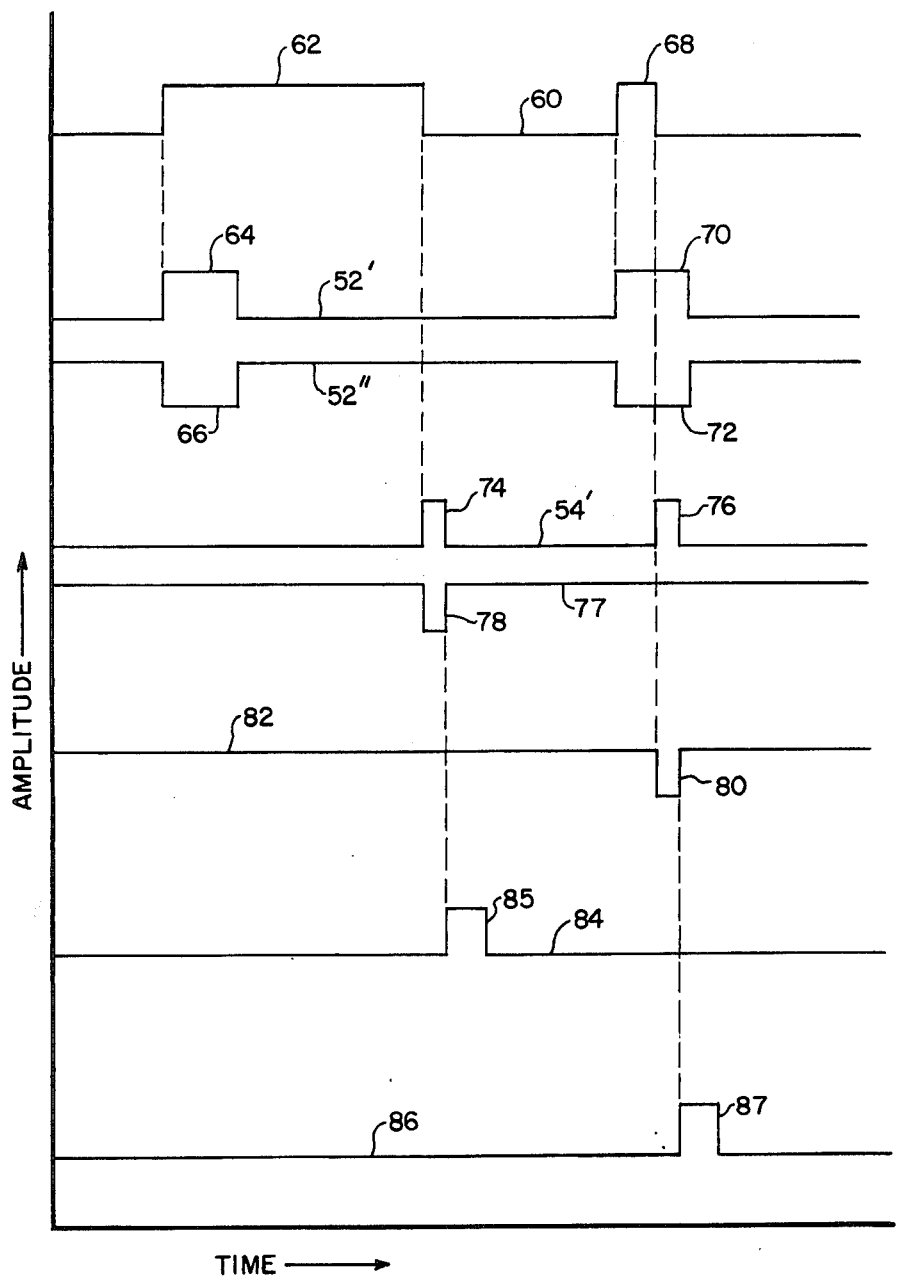
FIG. 5 is a graph illustrating various waveforms which may exist in the circuit illustrated by FIG. 4.

FIG. 5 represents graphs which indicate voltages which are developed in the circuit of FIG. 4, at locations indicated by numerals corresponding to the numerals designating the signal graphs, when pulses of different lengths are applied to the one-shot multivibrator circuits 52 and 54. Graph 60 represents the input wave applied to the input 61 of the analyzer 18 and corresponds in general to the graph 28 shown in FIG. 3. The leading edge of the pulse 62 triggers the one-shot multivibrator circuit 52 to produce an output at Q which is represented by the pulse 64 on the graph 52'. At the same time, the $\overline{Q}$ output of the one-shot multivibrator circuit 52 is represented by the pulse 66 which is in the opposite direction from the pulse 64. Consequently, a logical low condition is provided at the $\overline{Q}$ output and a logical high condition is provided at the Q output terminal. Since the circuit 52 will be triggered regardless of the duration of the pulse, the loss of power pulse 68 will also trigger the circuit 52 to provide the pulses 70 and 72.

Graph 54' represents the output conditions at the Q output of the circuit 54. The pulse 74 occurs at the trailing edge of the pulse 62 and the pulse 76 occurs at the trailing edge of the pulse 68. Since the relative length of time the circuits 52 and 54 are triggered is different, and since the circuit 52 is triggered for a longer time than the circuit 54, the pulses 64 and 70 are longer than the pulses 74 and 76. Consequently, a distinction is established between pulses from the circuits 52 and 54 depending upon whether the originating pulse was one of relatively long duration or of relatively short duration. That is, when the input pulse 62 is long, as would be represented by a normal time interval pulse, the pulses 64 and 74 from the multivibrator circuits would not exist at the same time. However, when the input pulse 68 is relatively short as would occur with a loss of power pulse, the pulses 70 and 76 from the oneshot multivibrator circuits 52 and 54, respectively, exist partially for a simultaneous period.

The multivibrator circuits 52 and 54 are appropriately connected to the NAND gates 56 and 58 to provide the output pulses 78 and 80 of the graphs 77 and 82, respectively, according to the corresponding input pulses. For example, with an input pulse corresponding to pulse 62, or a time interval pulse, both inputs to the NAND gate 56 would be at a high logic level when the pulse 74 occurs. Thus, the output of the NANC gate 56 would produce the pulse 78. Since, at all times during the pulse 62, both inputs to the gate 58 are not high, the output from the gate 58 remains high as indicated by graph 82. Consequently, when the input waveform contains a long pulse corresponding to a time interval signal, a negative pulse occurs at the output of the NAND gate 56. Also, from inspection of FIG. 5, it can be seen that when the input pulse 68, corresponding to a power loss pulse, is applied to the multivibrator circuits 52 and 54, both inputs to the NAND gate 58 will be high when the pulse 76 occurs, thus producing the pulse 80. Therefore, the one-shot multivibrators 52 and 54 and the NAND gates 56 and 58 produce a pulse width discriminating circuit or pulse duration detecting means 83 which recognizes the length of the input pulses and produces an output at one of two terminals depending upon the length of the input pulse. Graphs 84 and 86 including pulses 85 and 87, respectively, represent the logic levels at the Q outputs of the one-shot multivibrator circuits 88 and 90.

The pulse duration recognizing and detecting circuitry, 83 includes terminals 92 and 94 developing the negative pulses of the graphs 77 and 82, respectively, according to the duration of the input pulses. If only "short" pulses are detected at terminal 94 and no pulses are detected at terminal 92, it is apparent that the format of the tape recording is then shown by graph 22 in FIG. 3 which corresponds to earlier or normal type RB time interval pulse recordings. However, if negative pulses also occur at the terminal 92, it can be assumed that the recording format corresponds to the graph 24 shown in FIG. 3 wherein the time interval pulses are recorded in the NRZ form. With such format, any pulses occurring at the terminal 94 would indicate a power loss pulse on the magnetic tape recording.

Assuming now, for the sake of simplicity, that the normal mode of recording format of graph 22, is received whereby pulses 80 occurring at terminal 94 in FIG. 4 will represent the short RB time interval pulses on the recording tape. Since no intelligence is present on the recording tape representing loss of power, it is only required by the translator to transfer or convey the RB pulses on through to the analyzing circuits of the computer. This is accomplished by proper conditioning or programming of the NAND gates 96 and 98. Proper conditioning requires that the input lines 100 and 102 to the NAND gates 96 and 98, respectively, represent a high logic level. This is accomplished either manually or automatically by other components in the translator, as will be described in more detail hereinafter. When such is the case, the high level pulses 87 of graphs 86 occurring at the Q output of the multivibrator circuit 90 are transferred from the output 103 of the NAND gate 98 which produces the time interval pulses of the computer analyzing circuits. The output 103 forms a first output of the analyzer 18. Thus, the system described herein is compatible with recording tapes made with conventional RB time interval pulses and without any pulses representing power losses.

Now assuming that the input signal is derived from a recording tape which has been recorded according to the LOP recording mode format which contains both NRZ timing pulses and RB loss of power (LOP) pulses, several different conditions in the circuit shown in FIG. 4 occur. The longer duration time interval pulses are now indicated by the pulses 78 at the terminal 92. Therefore, it is desirable to transfer these pulses to the interval pulse output 103 of the NAND gate 98 for connection to the analyzing circuits of the computer. This is accomplished, again, by either manual or automatic control of the inputs to the NAND gates 98 and 104 described hereinbelow. The proper conditioning or programming for the LOP mode provides a high level logic input at the input line 105 of the gate 104. Consequently, a positive pulse 85 from the Q output of the circuit 88 which corresponds to a pulse at the terminal 92 is transferred through the gate 104 and the gate 98 to the output 103 to the analyzing circuits of the computer.

When the longer pulses represent the time interval signals and are transferred to the analyzing circuits of the computer, the translator system is conditioned or programmed to detect a short pulse at the terminal 94 for indicating a power loss signal. Before proceeding with a description of how the pulses at the terminal 94 are recognized as power loss signals, a description of various means for programming or conditioning the circuit shown in FIG. 4 for operating in normal of LOP modes so as to properly interpret the received pulse information according to the corresponding recording format will be described.

A latch circuit 114 includes the NAND gates 106 and 108. The output terminals 110 and 112 of the latch circuit 114 must have the proper logic level for programming the gates 96 and 104 according to the format of the recorded tape. When the recorded tape contains RB pulses for the time interval signals, gate 96 is to be opened. Consequently, a high logic level is required at terminal 112. This is accomplished by placing at least one of the input lines to the NAND gate 106 at a low logic level for at least an instant of time. This can be accomplished manually by grounding the terminal 115 by setting the switch 116 to "normal". For manual operation of an LOP tape format which contains long time interval pulses, the terminal 110 should be held at a high logic level. This can be accomplished manually be grounding the terminal 118 by setting the switch 116 to LOP. Thus, by manual control of the latch circuit 114, suitable conditioning or programming of the gates 86 and 104 can be accomplished to transfer the proper signals through the gate 98 and to the output 103 to indicate the time interval pulses on the recorded tape having the LOP format. When manual control is used, the inputs to the inverters 120 and 122 from the computer are not required.

Control of the latch 114 may also be maintained by computer switches associated with the translator system. The computer can be programmed to accept tapes of one format or the other and apply appropriate signals to the inverters 120 and 122 to properly set the latch 114 according to the type of recording format being used with the particular translator. This method may be useful when data is inserted into the computer prior to translation which identifies each recorder and the type of recording format expected. As each tape is translated, its identification keys the computer program to set the latch 114 to the proper state.

In additon to such a computer control method, an automatic control method for setting the proper state of the latch 114 may be used according to the circuit shown in FIG. 4. According to the automatic arrangement, the circuit recognizes the first pulse which is supplied from the recording tape. It is assumed that the first pulse is a time interval pulse since the probability of receiving a loss of power pulse as the first pulse from a recording tape is very remote. Thus, assuming that the first pulse from the recording tape corresponds to an RB timing interval pulse, a pulse occurs at the terminal 94. This is applied through the inverter 126 to the NAND gate 128. The latch 130, which includes the NAND gates 132 and 134, would have been reset at the terminal 136 by the computer prior to commencing the processing of the pulses from the recording tape. Thus, the logic level at the input lines 138 and 140 of the NAND gates 128 and 142 is high. The input lines 146 and 148 to the NAND gates 128 and 142 are also high when the switch 150 is opened. Consequently, the high level from the inverter 126 is applied to the gate 128 which applies a low level logic input to the gate 106 and sets the latch 114 in the proper condition for transfer of the short signals as described in more detail concerning the manual method of operation of the latch 114. The "short" signal at the terminal 94 also triggers the multivibrator 90 which sends a pulse from its $\overline{Q}$ output through the NAND gate 152 and the inverter 154 to the NAND gate 132 of the latch 130. This changes the state of the latch 130 so that low logic levels are applied at the input lines 138 and 140 of the NAND gates 128 and 142, respectively. Thus, subsequent pulses at the terminal 94 or from the terminal 92 cannot pass through the NAND gates 128 and 142 to change the condition of the latch 114.

Assuming that the first pulse contained a time interval signal which produced a "long" or NRZ pulse at terminal 92, the description concerning the setting of the latch 114 would be similar except that the input signal would be transferred through the inverter 156 and the gate 142 to properly set the latch 114. The subsequent pulse protection provided through the gate 152 and the inverter 154 would also be applicable to the establishment of the latch condition initially by the pulse from the terminal 92.

Regardless of the method used to set the latch 114 for proper interpretation of the recording format, additional circuitry is required to distinguish a "short" pulse at the terminal 94 as a loss of power pulse when "long" pulses at the terminal 92 incidate timing interval pulses on the recorded tape. Therefore, the discussion following assumes that the recording format contains NRZ pulses corresponding to time interval signals and RB pulses corresponding to loss of power signals.

When the translator circuits have been placed in a condition to correctly translate a recording tape which contains loss of power pulses, it is necessary that the translator contain circuitry which will detect a pulse occurring at the terminal 94. This is accomplished in the specific embodiment shown in FIG. 4 with the help of the NAND gates 160, 162 and 164, and the latch circuits 166 and 168. At the trailing edge of the pulse occurring at the terminal 94, the Q output of the one-shot multivibrator circuit 90 provides a high logic input pulse 87 to the input line 170 of the NAND gate 160. The input line 172 of the NAND gate 160 already has a high logic level when the circuit is programmed for processing tapes containing loss of power pulses. Assuming that the "short" pulse occurs within a predetermined length of time after the occurrence of a time interval pulse at terminal 92, the input line 174 to the NAND gate 160 will also be at a high logic level. Thus, the output of the NAND gate 160 goes low when a loss of power pulse is received within a predetermined amount of time after a time interval pulse.

If the loss of power pulse at terminal 94 is not received within the predetermined length of time after the time interval pulse at terminal 92, the NAND gate 160 will not be opened by the one-shot multivibrator circuit 176 and the loss of power pulse will not be registered as such by the circuit shown in FIG. 4. Consequently, the multivibrator circuit 176, which has a duration interval equal to the predetermined length of time discussed above, performs a masking function which prevents extraneous pulses from being interpreted as loss of power pulses. In other words, a pulse at the terminal 94 will not be registered as a loss of power pulse unless it occurs during the time the multivibrator circuit 176 is triggered after the time interval pulse at terminal 92 is detected. With this protective feature, the loss of power pulses must be placed upon the magnetic tape only at predetermined intervals which are relatively close to when the time interval pulse is applied to the magnetic tape. In this specific embodiment of the invention, the loss of power pulse must be applied within one and one-half minutes prior to occurrence of a time interval pulse when the time interval is 15 minutes. That is, the loss of power pulse is applied by the recording apparatus within 10% of the time interval before the time interval pulse is applied to the magnetic tape. It should be remembered that the recorded tapes are read in the opposite direction from which they were recorded.

When the loss of power pulse has been transferred through the NAND gate 160, the latch circuit 168 is set to produce a high logic level at terminal 180. Initially, the latch circuit 168 was reset by the computer by application of a proper logic level to the terminal 182. Circuitry in the computer also controls the logic levels at the terminals 184 and 186. When a time interval pulse is detected by the computer from the NAND gate 98, a change in the logic level applied to terminals 184 and 186 occurs. Thus, after a loss of power pulse is received, the next time interval pulse causes the terminal 184 to acquire a high logic state and allow the gate 162 to set the latch 166 in such a condition that a high logic level exist at the terminal 188. The computer then applies a logic level to the terminal 182 which resets the latch 168 so that it may be ready to detect the next loss of power pulse and, at the same time, applies a high logic level to the terminal 186 which allows the NAND gate 164 to send an LOP signal on the LOP output line 190, representing a loss of power pulse, to the computer. The output 190 forms the second output of the analyzer 18.

The signal to the computer from the NAND gate 164 is stored in the appropriate register or tape to indicate that a loss of power has occurred during the recording of the magnetic tape at the electrical meter installation. The computer might be programmed to simply indicate on the readout that such a loss of power has occurred, or it may be programmed to manipulate the energy or demand readings in a manner consistent with a loss of power at the particular time indicated, such as to insert estimated energy or demand readings for a period equal to the duration of the power outage.

The translator system disclosed herein provides a convenient and reliable method for recognizing loss of power pulses on magnetic recording tapes which contain both time interval pulses and loss of power pulses on the same tape channel. In addition, since numerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A translator for processing meter telemetry magnetic recording tapes containing time interval and power loss pulses recorded in either of two formats, wherein a first format includes the time interval pulses and the power loss pulses recorded with first and second waveforms, respectively, and wherein a second format includes only time interval pulses recorded with one of said first and second waveforms, said translator comprising:
   pulse shaping means receiving the recorded waveforms and producing a first signal pulse corresponding to said first waveform and a second signal pulse corresponding to said second waveform, said first signal pulse having a longer duration than said second signal pulse;
   pulse duration recognizing means receiving said first and second signal pulses and producing an output pulse at a first terminal only when said first signal pulse is applied to the recognizing means and further producing an output pulse at a second terminal only when said second signal pulse is applied to the recognizing means;
   first gating means responsive to said output pulses produced at both of said first and said second terminals and transferring pulses corresponding to the time interval pulses to a first output for further processing in the translator;
   a second gating means responsive to said output pulses produced at one of said first and second terminals and transferring a pulse corresponding to a power loss pulse to the a second output for further processing in the translator; and
   means selectively enabling and disabling said first and second gating means in at least two conditions, said first condition effecting response to said second recording format to only produce said time interval pulses at said first output, and said second condition effecting response to recordings in said first format to produce said time interval pulses and said power loss pulses at said first and second outputs, respectively.

2. The translator of claim 1 wherein the first waveform corresponding to the time interval pulses consists of non-return to zero pulses and the second waveform corresponding to the power loss pulses consists of return-to-bias pulses.

3. The translator of claim 2 wherein the means for selectively enabling and disabling said first and second gating means includes circuit means which detects the output pulses developed at either of said first and said second terminals by an initial time interval pulse having either a non-return to zero waveform or a return to bias waveform and establishing a corresponding one of said first and said second conditions.

4. The translator of claim 1 wherein the pulse duration recognizing means includes first and second one-shot multivibrator circuits having their inputs connected in common to receive the first and second waveforms, said second multivibrator circuit generating an output pulse which is shorter than the output pulse generated by the first multivibrator circuit, first and second NAND gates connected to the outputs of the first and second multivibrator circuits, with the first terminal of the recognizing means being located at the output of the first NAND gate and the second terminal of the recognizing means being located at the output of the second NAND gate.

5. The translator of claim 4 wherein the frist gating means includes third and fourth NAND gates having inputs coupled to the first terminal and the second terminal, respectively, of the pulse duration recognizing means, said third gate and said fourth gate being alternately enabled and disabled for selective transfer of pulses from one of said first and said second terminals to said first output.

6. The translator of claim 1 wherein the means for selectively enabling and disabling said first and second gating means includes means which may be manually operated to establish either of said first and said conditions for transferring said output pulses which correspond to time interval pulses to said first output.

7. The translator of claim 1 including timing circuit means repsonsive to each of the output pulses at the other of said first and second terminals to enable said second gating means for a predetermined time period between the aforesaid output pulses for preventing recognition of a power loss pulse except within a predetermined time period between times that time interval pulses are detected.

* * * * *